US012390392B2

(12) United States Patent
Pietrangelo

(10) Patent No.: US 12,390,392 B2
(45) Date of Patent: Aug. 19, 2025

(54) CHEST COMPRESSION ASSIST GLOVE

(71) Applicant: Lee Pietrangelo, Westlake, OH (US)

(72) Inventor: Lee Pietrangelo, Westlake, OH (US)

( * ) Notice: Subject to any disclaimer, the term of this patent is extended or adjusted under 35 U.S.C. 154(b) by 749 days.

(21) Appl. No.: 17/831,002

(22) Filed: Jun. 2, 2022

(65) Prior Publication Data

US 2023/0390151 A1 Dec. 7, 2023

(51) Int. Cl.

*A61H 31/00* (2006.01)
*A41D 19/00* (2006.01)
*A61H 37/00* (2006.01)

(52) U.S. Cl.

CPC ....... *A61H 31/007* (2013.01); *A41D 19/0024* (2013.01); *A41D 19/0044* (2013.01); *A61H 37/00* (2013.01); *A41D 2400/322* (2013.01); *A61H 2201/1635* (2013.01); *A61H 2201/165* (2013.01); *A61H 2201/169* (2013.01)

(58) Field of Classification Search

CPC .......... A41D 2400/322; A41D 19/0024; A41D 19/0044; A61H 37/00; A61H 1/008; A61H 39/04; A61F 5/05866

See application file for complete search history.

(56) References Cited

U.S. PATENT DOCUMENTS 5,257,418 A 11/1993 Jaskiewicz
5,295,481 A 3/1994 Geeham
5,454,779 A 10/1995 Lurie
6,454,681 B1 9/2002 Brassil
6,669,657 B1 12/2003 Ongwela
8,029,414 B2 10/2011 Ingvast
8,622,940 B2 1/2014 Udassi
9,028,259 B2 5/2015 Centen
9,789,026 B2 10/2017 Hanson
11,123,261 B2 9/2021 Voss
2009/0171257 A1* 7/2009 Centen .................. A61F 5/0118 602/21
2012/0167272 A1 7/2012 Scaff
2014/0041096 A1 2/2014 Takahashi
2015/0257835 A1* 9/2015 Le Blanc ............... A61B 42/50 2/161.7
2016/0113834 A1* 4/2016 Bring ..................... A61H 7/007 601/134
2017/0196767 A1 7/2017 Cox

FOREIGN PATENT DOCUMENTS

CN 202982593 U 6/2013
CN 105106003 A 12/2015
WO 2013114169 A1 8/2013

* cited by examiner

*Primary Examiner* — Kendra D Carter
*Assistant Examiner* — Jaeick Jang
(74) *Attorney, Agent, or Firm* — Lambert Shortell & Connaughton; David J. Connaughton, Jr.; Justin P. Tinger

(57) ABSTRACT

A chest compression assist glove is disclosed herein. The chest compression assist glove solves numerous problems in the performance of CPR by a human and is intended to provide mechanical advantage for a single rescuer performing chest compressions. The chest compression assist glove disclosed herein mitigates the fatigue and degradation of performance experienced by the rescuer due to the high energy demands of performing an intrinsically mechanically disadvantaged action over a sustained period.

18 Claims, 3 Drawing Sheets

CHEST COMPRESSION ASSIST GLOVE

BACKGROUND

Technical Field

The present disclosure relates generally to a chest compression assist glove. More particularly the present disclosure relates to a glove used to aid first responders, medical personnel, and other individuals in the administration of sustained cardio-pulmonary resuscitation ("CPR").

Description of Related Art

The critical component to successful resuscitation of any victim of cardio-pulmonary arrest is preservation of blood flow and perfusion to the brain and heart, which is only achieved by effective chest compressions maintained over time and serially reproducibly at a depth of 2 inches in a direction anterior to posterior into the thorax. Chest compressions can be achieved by electric-powered devices or by a human. Whether performed by a human or a device, chest compressions depress the sternum and chest wall, which, in turn, increases intra-thoracic pressure and compression of the heart, which, in turn, moves blood out of the heart and maintains threshold systemic blood pressure. Recoil of the chest wall upon completion of the compression provides negative intra-thoracic pressure which facilitates filling of the heart and co-incidental gas exchange in the lungs.

The challenge for many rescuers is muscle fatigue and performance degradation that commonly occurs with ongoing chest compressions, which typically are performed for thirty (30) minutes or more, at a rate of at least one hundred (100) compressions per minute, punctuated only by rest periods of less than five (5) seconds every thirty (30) seconds. Multiple rescuers are often required in rotation during CPR for a single victim to ensure adequately powered chest compressions on a sustained basis, due to the problem of single rescuer fatigue. The problem of single rescuer fatigue results from the fact that rescuers, regardless of muscular development, are in an inherently mechanically disadvantaged position while performing compressions properly.

There is a plethora of other potential problems with sustaining CPR over prolonged periods of time, especially when CPR is performed by a human, and there are also a seemingly infinite number of potential solutions to these problems. Therefore, what is needed is a chest compression assist glove having the following characteristics and benefits over the prior art.

SUMMARY

The subject matter of this application may involve, in some cases, interrelated products, alternative solutions to a particular problem, and/or a plurality of different uses of a single system or article.

In one aspect, a chest compression assist glove is disclosed. In this aspect, the chest compression assist glove comprises a dorsal side and a ventral side, and a hemispheric projection or power ball attached to the ventral side on an exterior of the glove. Also, in this aspect, the glove comprises a proximal and a distal end, wherein a wrist collar is attached to the proximal end, and the wrist collar defines a mouth, which provides access to an interior of the glove.

In another aspect, a method of using the chest compression assist glove is disclosed. In this aspect, the method comprises the steps of providing and donning a set of medical gloves, securing the chest compression assist glove over one of the medical gloves, placing the chest compression assist glove on a chest of a victim, and performing a cycle of repetitive chest compressions or CPR.

It should be expressly understood that the various physical elements of the present disclosure summarized and further disclosed herein may be of varying sizes, shapes, or otherwise dimensions and made from a variety of different materials or methods of manufacture without straying from the scope of the present disclosure.

DETAILED DESCRIPTION

Figure 1:
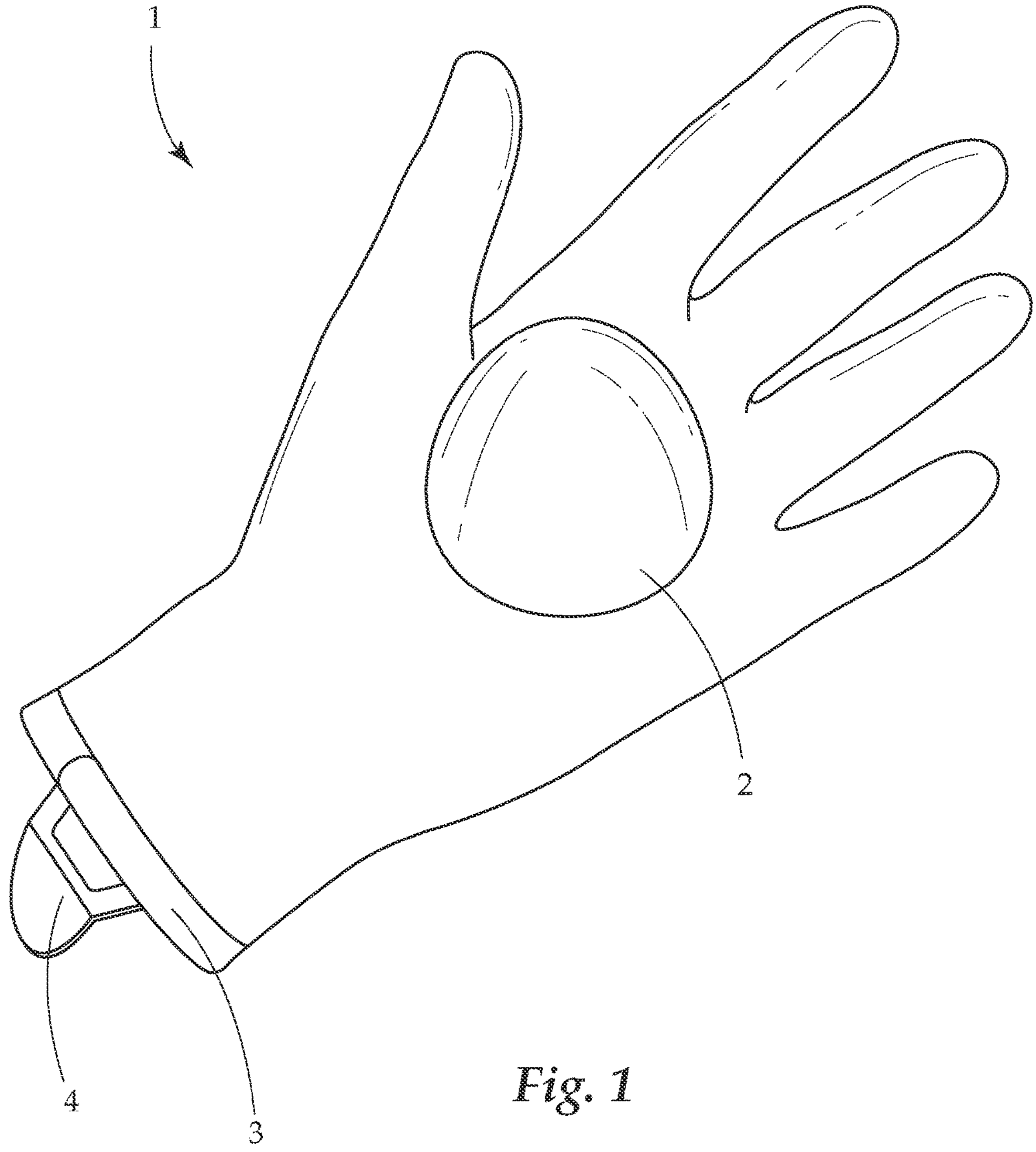
FIG. 1 provides a perspective view of an embodiment of the present disclosure.

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

Generally, the present disclosure concerns a chest compression assist glove. Embodiments of the glove and methods of using the same disclosed herein may be used to aid first responders, medical personnel, and other rescuing individuals in the administration of sustained CPR. Initially, the present disclosure solves several problems with the administration of CPR without mechanical assistance. For example, evolution of humans resulted in body mechanics that favor flexion over extension for most muscle groups. Inevitably, the action of performing chest compressions, which requires extension of the wrists and elbows for a prolonged period, is inherently a mechanically disadvantaged action. Another biomechanical disadvantage to the performance of chest compressions is the biological design of the palm of the hand, which is best suited for gripping (i.e., a flexion-based action), not pushing against a flat surface (i.e., an extension-based action) to efficiently generate force vectors away from the rescuer's body and onto the victim's chest. Rather, the biological design of the human hand more efficiently transfers force from the victim's chest to the rescuer's wrist and forearms as chest compressions are performed. Furthermore, yet another problem for rescuers with respect to the mechanics of chest compression comes from the anatomic and mechanical disadvantage of extension or flexion of a joint while the joint is already at or near its full extension or flexion point. In other words, because chest compressions must be performed when a rescuer's elbows are either nearly or completely fully extended, the performance of chest compression is a biomechanically inefficient process that results in early rescuer fatigue.

The chest compression assist glove disclosed herein provides mechanical advantages to the rescuer performing chest compressions in at least four (4) different, yet cumulative, ways. First, in one embodiment, a thick palm and finger plate, incorporated into the fabric of the glove, consolidates a force from the rescuer's entire palm. Second, in one embodiment, with the palm plate extending distally into the finger wells to the level of the proximal interphalangeal joint of a rescuer's fingers, some level of finger recruitment may occur so that force generation from the fingers is captured and also consolidated in the cardboard plate. Third, in one embodiment, a hemispheric projection attached to the palmar or ventral surface on the exterior of the glove translates the force from the palm plate to the chest wall of the victim. Translation of force through the hemisphere is efficient and occurs through meridional lines, as occurs in the transmission of force when force is applied from a base to an apex for all hemisphere or dome-shaped structures. Fourth, in one embodiment, the stiffness of the weave construction of the glove itself may provide for additional recruitment and consolidation of force from the entire hand and wrist, which can be more efficiently applied to the chest wall of the patient.

In one embodiment, an individual may perform CPR by kneeling or standing over the body of the victim, with the upper torso of the rescuer parallel to the torso of the victim, with the rescuer's arms fully extended and perpendicular to the victim. In this embodiment, the rescuer may preferably place their non-dominant hand on the distal third of the sternum and may also place their dominant hand over the contralateral, while interlocking the fingers in both hands. Downward force from the rescuer may be generated by a combination of rapid hip flexion (e.g., through contraction of the abdominal muscles and hip flexors) aided by the gravitas of the rescuer's body weight added to high-energy rapid bilateral wrist extension in conjunction with synchronous extension of both elbows.

In one embodiment, the performance of the aforementioned movements may result in a downward deflection of the non-dominant hand placed on the sternum and, correspondingly, downward deflection or compression of the sternum and chest wall. Termination of the compression may come when the rescuer reverses the process with rapid hip extension added to rapid high-energy flexion of both wrists synchronous with flexion of both elbows, which may allow the chest to rise or reflect in recoil. The cycle of repetitive synchronous extension-flexion of the wrists and elbows may generate the force necessary to create the cycle of compression followed by recoil of the chest cavity. In at least one embodiment, when the cycle of repetitive synchronous extension-flexion of wrists and elbows is performed with an embodiment of the chest compression assist glove placed on the rescuer's non-dominant hand, a mechanical advantage may be provided to the rescuer in the performance of chest compressions. As a result, the efficiency of the rescuer's aid delivery may increase, and the rescuer's performance degradation and fatigue may be mitigated, which may positively impact a desired outcome for the victim.

Turning now to FIG. 1, which provides a perspective view of the palmar side of an embodiment of the chest compression assist glove 1. In this embodiment, the chest compression assist glove 1 comprises a hemispheric projection 2, which may be referred to as a "power ball" 2, attached to the palmar or ventral side of the glove 1. The proximal end of the glove 1 comprises a wrist collar 3, into which an adjustable strap may be secured by a hook and loop mechanism. It should be expressly understood that fastening mechanisms other than hook and loop fasteners may be employed, including, but not limited to, button fasteners, buckle fasteners, fabric ties, and others. Also, in this embodiment, an extension guide 4 is attached to the wrist collar 3.

In a preferred embodiment, the diameter of the base of the power ball 2 is approximately two-thirds the width of the palm of the glove 1. When used throughout, the term "approximately" refers to a deviation of less than or equal to ten percent (10%) of the number mentioned. Also, the power ball 2 is positioned eccentric to the middle point of the palm and affixed to the palmar side of the glove at a position biased to the proximal half of the palm side (i.e., closer to the wrist). Also, in the preferred embodiment, the extension guide 4 is a silicone covered aluminum tongue which projects longitudinally along the long axis of the rescuer's forearm when the glove 1 is properly secured on the rescuer's hand. In the preferred embodiment, the extension guide 4 is also incorporated into the palmar or ventral side of the glove 1 (i.e., closer to the wrist) and contacts the rescuer's forearm at an angle so that the extension guide 4 reduces or completely blocks the flexion of the rescuer's wrist, which may decrease the work of maintaining the wrist in extension for the deflection portion of the chest compression movement. The angle of contact between the extension guide 4 and the rescuer's forearm is preferably less than or equal to thirty degrees (30°) of wrist extension.

The specific measurements and materials mentioned in the preceding paragraph and in others throughout may be considered critical to the present disclosure as they dramatically increase the efficiency and efficacy of using the glove 1 to resuscitate a victim without undue harm to the rescuer or the victim. For example, the power ball 2 being approximately two-thirds the width of the palm of the glove 1 ensures accurate placement of the power ball 2 on the chest of the victim. Moreover, as another example, silicone covering an aluminum extension guide 4 allows for the guide 4 to rub against a rescuer's forearm without causing bruising or damage to the skin.

Figure 2:
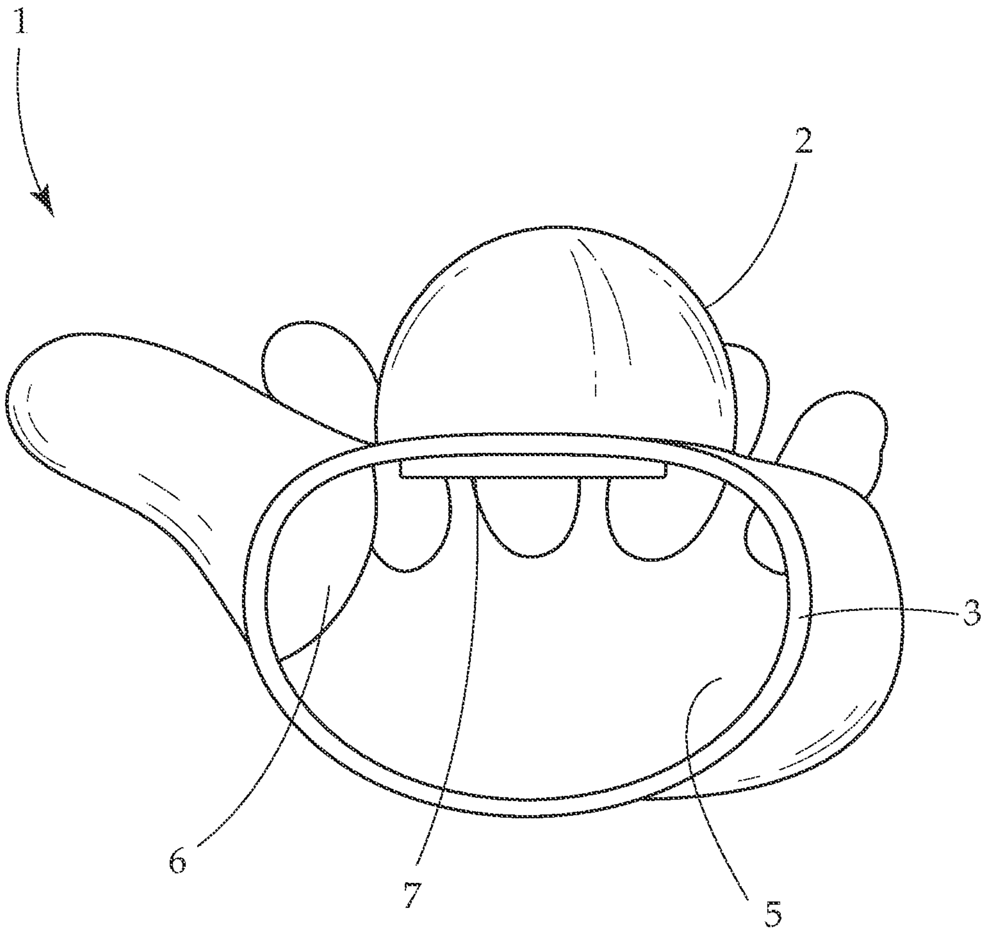
FIG. 2 provides another perspective view of an embodiment of the present disclosure.

FIG. 2 provides a long axis, planar view (i.e., palm side up view) of another embodiment of the chest compression assist glove 1, wherein the finger wells 6 can be seen in the interior through the mouth 5 of the glove 1. In this embodiment, the mouth 5 is defined by the wrist collar 3 on the proximal end of the glove 1. Also visible through the mouth 5 of the glove 1 is a palm plate 7. In this embodiment, the palm plate 7 is incorporated into the palmar or ventral part of the glove 1, internal to both the hand and finger wells 6, and affixed or incorporated into the fabric of the glove 1, as further represented in FIG. 3. The base of the power ball 2 is affixed to the exterior palmar side of the glove 1, and the apex of the power ball 2 projects away from the palmar side. When a rescuer performs chest compressions with the glove 1 of this embodiment, the force is translated from the palm plate 7, to the power ball 2, and finally to the chest of the victim.

In a preferred embodiment, the power ball 2 has a roughened silicone covering, which may provide greater efficiency to the performance of chest compressions during CPR. The reason for this is that a roughened silicone covering may provide increased friction against the skin or clothing of the victim or patient, which, in turn, may prevent slippage of the hand on the chest laterally across the chest wall, thus preventing a degradation in the transmission of force due to the resulting vectors of force becoming parallel instead of perpendicular to the chest wall. For these reasons, the roughened silicone covering for the power ball 2 may be considered critical to the present disclosure. Also, in a preferred embodiment, the palm plate 7 is made from a stiff cardboard material that may have a thickness of approximately three millimeters (3 mm), which may be considered critical for efficient and effective translation of force.

Figure 3:
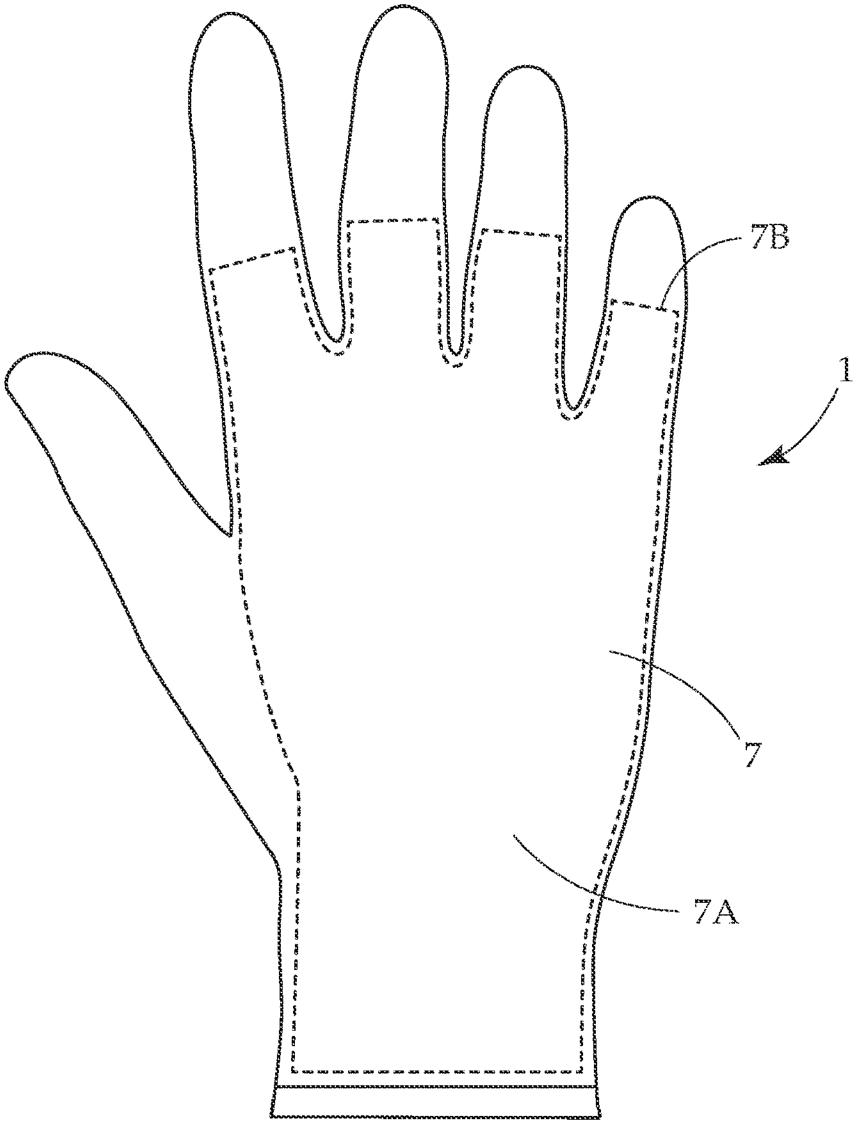
FIG. 3 provides a diagrammatic representation of an embodiment of the present disclosure.

As shown in FIG. 3, the palm plate 7 comprises a square-like palm portion 7A with finger portions 7B that project into the finger wells 6 to a limited distance that is meant to match the location of the proximal interphalangeal joints of a rescuer's fingers when said rescuer's hand is securely fitted inside the glove 1. In a preferred embodiment, the hand well and the finger wells 6 are manufactured to allow adequate room for easy hand and finger entry into the wells 6 upon donning of the glove 1, while also maintaining a snug fit commonly found in unrelated sports-type gloves, such as batting gloves.

Figure 4:
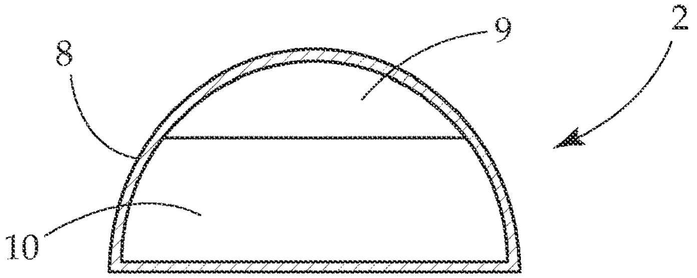
FIG. 4 provides a cross-sectional perspective view of an embodiment of the present disclosure.

Turning now to FIG. 4, which provides a cross-sectional perspective view of an embodiment of the power ball 2 in isolation. In this embodiment, the power ball 2 comprises a polygonal center core 10. In this embodiment, the center core 10 is made from a plurality of material, including, but not limited to, open-cell dense and firm foam rubber; however, other materials which efficiently transmit force from the base of the power ball 2 to its apex may also be used. Although, in a preferred embodiment, the use of at least open-cell dense and firm foam rubber may be considered critical to the functioning of the glove 1. Also, in the embodiment shown in FIG. 4, the center core 10 is covered by an exterior dome 8, and an air pocket 9 exists between the center core 10 and the interior apex of the dome 8. In a preferred embodiment, the dome 8 may critically comprise a silicone material. When the glove 1 is in use, the air pocket 9 provides for transmission of force to the chest wall of the victim while also providing a cushion, which prevents bruising of the chest wall over and above the cushion provided by the silicone dome 8 in the preferred embodiment. The reason for this is that the point of maximal force transmission from the base of the dome 8 to its apex begins to diminish past fifty degrees (50°) of an arc on the curvature of the dome 8 as the arc approaches the apex of the dome 8 from its base.

In a preferred method of using the glove 1, a rescuer first puts on nitrile or vinyl medical gloves and then secures the chest compression assist glove 1 over them, preferably on the rescuer's non-dominant hand. The rescuer then places their gloved hand on the distal third of the sternum on the victim's chest and then places their non-gloved hand over their gloved hand while interlocking fingers from both hand. The apex of the power ball 2 is preferably the main or only point of contact on the chest center to the distal third of the victim's sternum. Chest compressions may then be performed as previously described herein. In this way, a single rescuer may perform effective life-saving chest compressions for an extended period of time without diminished capacity due to exhaustion and muscle fatigue.

While several variations of the present disclosure have been illustrated by way of example in preferred or particular embodiments, it is apparent that further embodiments could be developed within the spirit and scope of the present disclosure, or the inventive concept thereof. However, it is to be expressly understood that elements described in one embodiment may be incorporated with any other embodiment in combination with any other elements disclosed herein in the various embodiments. It is also to be expressly understood that any modifications and adaptations to the present disclosure are within the spirit and scope of the present disclosure, and are inclusive, but not limited to the following appended claims as set forth below.

What is claimed is:

1. A chest compression assist glove comprising:

a dorsal side and a ventral side;

a power ball attached to the ventral side on an exterior of the glove;

a proximal end and a distal end;

a wrist collar attached to the proximal end;

an extension guide attached to the wrist collar; and wherein the wrist collar defines a mouth, the mouth providing access to an interior of the glove and wherein the extension guide further comprises an aluminum tongue projecting longitudinally away from the proximal end of the glove, wherein the aluminum tongue is covered by a material, the material comprising silicone.

2. The chest compression assist glove of claim 1 further comprising a hand well and a plurality of finger wells in the interior of the glove.

3. The chest compression assist glove of claim 2 wherein the hand well is positioned at a middle point of the glove, and the plurality of finger wells is positioned at the distal end of the glove.

4. The chest compression assist glove of claim 1 wherein the extension guide comprises an angle less than or equal to thirty degrees (30°).

5. The chest compression assist glove of claim 1 further comprising a palm plate attached to the ventral side of the glove.

6. The chest compression assist glove of claim 5 wherein the palm plate comprises a palm portion and a plurality of finger portions.

7. The chest compression assist glove of claim 6 wherein the plurality of finger portions extends into a plurality of finger wells positioned at the distal end of the glove.

8. The chest compression assist glove of claim 5 wherein the palm plate is located within the interior of the glove by being incorporated into a fabric of the glove.

9. The chest compression assist glove of claim 5 wherein the palm plate comprises a cardboard material, the cardboard material comprising a thickness of approximately three millimeters (3 mm).

10. The chest compression assist glove of claim 1 wherein the wrist collar further comprises an adjustable strap and a hook and loop fastener.

11. The chest compression assist glove of claim 1 wherein a diameter of a base of the power ball is approximately two-thirds of a width of the ventral side of the glove.

12. The chest compression assist glove of claim 1 wherein the power ball is attached to the ventral side in a position biased toward the proximal end of the glove.

13. The chest compression assist glove of claim 1 wherein the power ball comprises a base and an apex, the base attached to the ventral side of the glove, and the apex projects away from the ventral side.

14. The chest compression assist glove of claim 1 wherein the power ball comprising a center core covered by a dome, and further comprising an air pocket between the center core and an apex of the dome.

15. The chest compression assist glove of claim 14 wherein the center core comprises an open-cell dense material and a firm foam rubber material.

16. The chest compression assist glove of claim 14 wherein the dome comprises a silicone material.

17. A method of using a chest compression assist glove, the chest compression assist glove comprising:

a dorsal side and a ventral side;

a power ball attached to the ventral side on an exterior of the glove;

a proximal end and a distal end;

a wrist collar attached to the proximal end;

an extension guide attached to the wrist collar; and wherein the wrist collar defines a mouth, the mouth providing access to an interior of the glove and wherein the extension guide further comprises an aluminum tongue projecting longitudinally away from the proximal end of the glove, wherein the aluminum tongue is covered by a material, the material comprising silicone;

the method comprising:

providing and donning a set of medical gloves;

securing the chest compression assist glove over one of the set of medical gloves;

placing the chest compression assist glove on a chest of a victim; and performing a cycle of repetitive chest compressions.

18. The method of claim 17 securing the chest compression assist glove over the one of the set of medical gloves; comprises securing the chest compression assist glove on a non-dominant hand.

* * * * *